Jan. 25, 1966  J. J. LOVINGHAM  3,230,704
ROCKET ENGINE
Filed Oct. 30, 1961

INVENTOR.
JOSEPH J. LOVINGHAM

BY
*William R. Wright Jr.*
AGENT

United States Patent Office 3,230,704
Patented Jan. 25, 1966

3,230,704
ROCKET ENGINE
Joseph J. Lovingham, Madison, N.J., assignor to Thiokol Chemical Corporation, Bristol, Pa., a corporation of Delaware
Filed Oct. 30, 1961, Ser. No. 148,382
4 Claims. (Cl. 60—35.6)

This invention relates generally to rocket powerplants and more particularly to a liquid propellant rocket engine having improved means for varying the thrust level produced in operation.

Rocket powerplants having a high or boost thrust level and a lower or sustained phase thrust level are known in the art and these employ various means for varying the thrust level. Many of these are overly complicated or require complicated co-operating systems and controls so as to increase rather than minimize the likelihood of operation failure of one or more of the components. Others require fueling or arming at the site of intended use with all of the attendant explosion and other hazards and inconveniences.

The main object of the present invention is to provide an improved variable thrust rocket powerplant of the prepackaged liquid propellant type which may be loaded and hermetically sealed at the factory and stored ready for instant use for indefinite periods at the site of intended use.

An important object of the present invention is to provide an improved rocket powerplant in which its initial or boost thrust level during operation can be varied to a sustain thrust level by simple means responsive to a single remote-controlled command signal.

Another important object of the present invention is to provide an improved two-stage rocket powerplant in which the thrust level can be instantly varied in a simple practical manner by means of a command-signal-controlled pressure operated device and the pressure of one of the propellants.

A further important object of the present invention is to provide an improved, prepackaged, liquid propellant rocket engine employing a fuel cooled pintle for throttling and fuel control purposes in changing from booster to sustain thrust operation as controlled by a single command signal.

Other objects and advantages of the present invention will become apparent during the course of the following description.

In its broadest aspects the invention contemplates a prepackaged or loaded and hermetically sealed two-stage liquid propellant rocket engine which, during operation at the high or boost phase level and upon a command signal to a single squib cartridge, will instantly vary propellant flow and nozzle throat area for operation at a lower or sustain phase level.

In the drawings I have shown one embodiment of the invention. In this showing:

Figure 1:
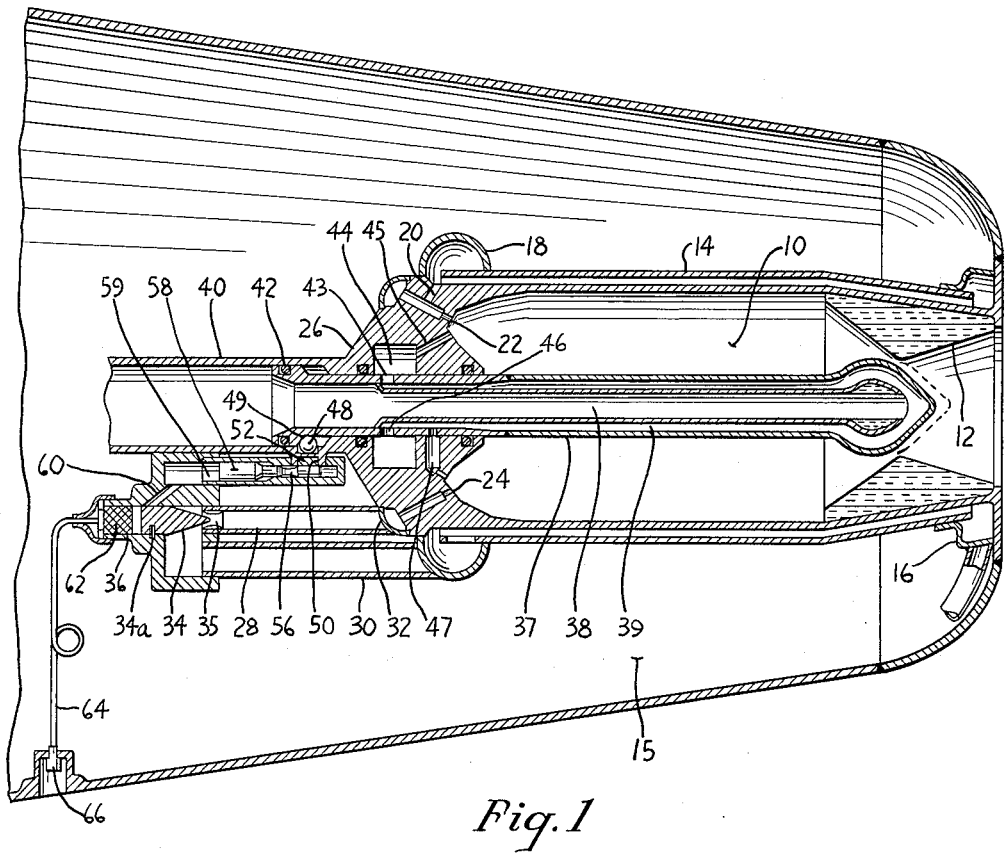
FIGURE 1 is a fragmentary, central longitudinal sectional view, parts being shown in elevation of the combustion chamber, the propellant flow and control, and the control means of the rocket powerplant comprising the invention.
Figure 2:
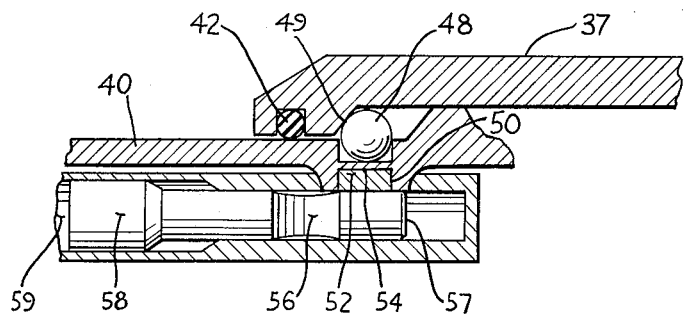
FIGURE 2 is a fragmentary cross-sectional enlarged view of the detent and its operating means.

Referring to the drawings, numeral 10 designates a combustion chamber terminating aft in a thrust nozzle 12 and having spaced walls 14 for regenerative cooling by one of the propellants. As shown, fuel is delivered from the fuel tank 15 to an aft manifold 16 and passes through the walls 14 to a manifold 18 and thence by a passage 20 to a fuel injector 22. A second fuel injector 24 is mounted in the head 26 of the combustion chamber 10 and is connected with the fuel manifold 18 by means of bypass conduits 28 and 30 intermediately connected with a control header 32. A tapered plug valve 34 is slidably mounted in a bore 36 of the control header and adapted to seat in a venturi insert 35 in the end of the bypass conduit 28 as will be explained, to shut off flow of fuel to the injector 24 during the sustain or low thrust operation phase. A shear pin 34a retains the plug valve 34 in place until the valve is operated.

A pintle 37 having a central passage 38 and an annular outer cooling return passage 39, is slidably mounted centrally of the combustion chamber 10 in the end of the oxidizer conduit 40 and in the header 26 and is provided with O-ring seals 42. The pintle 37 includes oxidizer outlet ports 43 communicating with a manifold 44 and by means of a passage 45, with the combustion chamber 10 adjacent the fuel injector 22. Similarly, pintle ports 46 communicate with a smaller manifold 47 which delivers oxidizer to a point adjacent the fuel injector 24.

The pintle 37 is adapted to move from the boost phase full line position shown to the sustain phase position indicated by the dotted line position. Pending the command signal operation to be explained, the pintle is retained in the posiiton shown by a ball detent 48 engaging the pintle shoulder 49. The ball 48 is mounted in an oxidizer conduit aperture 50 by a diaphragm support 52 on a thin hermetic barrier or diaphragm 54 integral with oxidizer conduit 40 and made flexible, deformable or stretchable, such as by local annealing of barrier 54. The support 52 is adapted to fall into an opening 56 upon movement of a slide 57 formed integrally with a tapered plug 58 which is slidably mounted in a chamber 59 which is closed by the control header 32.

The control header bore 36, which has communication with the tapered plug slide chamber 59 by means of a passage 60, is provided with a solid propellant squib cartridge 62 connected by an electrical lead 64 to the command signal impulse receiver 66.

When a packaged and hermetically sealed liquid rocket powerplant constructed in accordance with the principles of the invention is to be fired, it is removed from storage and placed in firing with its attached air vehicle.

Upon ignition of the rocket engine, fuel will be delivered to both of the injectors 22 and 24 and oxidizer will be delivered to a point in the combustion chamber 10 adjacent each injector as explained, for booster phase or high level thrust operation. During this phase, the pintel 36 will remain locked by the ball 48 in the full line position shown for maximum throat area.

At the conclusion of booster phase operation, a signal from the command circuit ignites the solid propellant squib cartridge 62. The generated gases drive the tapered plug valve 34 forward, shearing pin 34a and forcing plug valve 34 onto its venturi seat 35 to shut off the flow of fuel through the conduits 28 and 30 to the fuel injector 24.

Simultaneously, the valve 34 having uncovered the passage 60, gas pressure seats the plug 58 in the chamber 59 moving the slide 57 to the right and the diaphragm support 52 drops into the slide opening 56 leaving the diaphragm barrier 54 unsupported. Under the differential pressure acting on the pintle 37 (oxidizer tank-nozzle pressure), the pintle shoulder 49 will force the restraining ball 48 into the flexible and deformable isolation barrier or diaphragm 54 sufficiently so that the pintle 37 is free to pass over the ball 48. This permits pintel 37 to move to the right to the dotted line position to decrease the throat area of the thrust nozzle 12.

It is to be noted that the oxidizer cools the pintle 37 in passing rearwardly through the passage 38 and back through the outer annular pasage 39 to the oxidizer manifolds 44 and 47 and that the movement of the pintle 37 moves the oxidizer port 46 out of alignment with the manifold 47. Thus, the oxidizer to the area adjacent the injector 24 is also shut off.

Thus, the rocket powerplant is readily converted from boost to sustain operation phase in a simple, practical manner bzy a single command signal which simultaneously effects a reduction in fuel and oxidizer injection while varying the throat area of the thrust nozzle in order to maintain an efficient substantially constant combustion chamber pressure.

In the claims, the expression "boost" stage, condition or thrust refers to high level thrust of the powerplant and "sustain" stage, condition or thrust refers to low or a lower level of thrust.

It is to be understood that the form of the invention herewith shown and described is to be taken as a preferred example of the same and that various changes in the size, shape and arrangement of parts may be resorted to without departure from the spirit of the invention or the scope of the subjoined claims.

What is claimed is:

1. In a two stage rocket powerplant including a combustion chamber terminating in a thrust nozzle and having sustain and boost stages, the combination of first means for furnishing propellants to the combustion chamber during both stages of operation, second means for furnishing additional propellants to the chamber during boost stage including fluid-operated valves controlling the flow of propellants, control means operable upon conclusion of boost stage to shut off said second means for sustain stage operation, said control means including a pressure generator operatively connected to effect the closing of said valves and said generator comprising a solid propellant cartridge ignitable upon a command signal, one of said valves being operable to closed position by propellant pressure, and detent means holding said one valve in open position and being releasable by pressure from said generator to permit movement of said one valve to closing postion.

2. The combination recited in claim 1 wherein said one valve is part of a pintle slidably mounted in the chamber, and its movement to close said one valve reduces the throat area of the nozzle to sustain stage operation.

3. A two stage rocket powerplant for boost-sustain operation comprising a combustion chamber including a head and terminating in a thrust nozzle, a hollow pintle slidably mounted in said head for movement from a boost position toward the nozzle to a sustain position, means locking said pintle in boost position, means for furnishing fuel to the chamber during boost and sustain stages, additional means for furnishing fuel to said chamber during boost stage, oxidizer manifolds formed in said head and communicating with said chamber, spaced ports formed in said pintle and having separate communication with said manifolds, means for furnishing oxidizer under pressure to said pintle, said ports, said manifolds and into said chamber for combustion with the fuel therein during boost stage, and control means operable to unlock said pintle locking means and shut off said boost fuel furnishing means, the pressure of said oxidizer moving said pintle to sustain position and the ports out of line with one of said manifolds to reduce oxidizer flow in said sustain position.

4. The combination recited in claim 3 wherein said control means includes a solid propellant gas generator ignitable by remote control, and said locking means and said fuel furnishing means are responsive to fluid pressure from said generator to respectively unlock said pintle and shut off said boost fuel.

References Cited by the Examiner

UNITED STATES PATENTS

| | | | |
|---|---|---|---|
| 2,780,914 | 2/1957 | Ring | 60—35.6 |
| 2,814,929 | 12/1957 | Morley et al. | 60—35.6 |
| 2,972,998 | 2/1961 | Detwiler | 137—68 |
| 3,011,309 | 12/1961 | Carter | 60—35.6 |
| 3,022,793 | 2/1962 | Thorp | 137—68 |

MARK NEWMAN, *Primary Examiner.*

JULIUS E. WEST, ABRAM BLUM, SAMUEL LEVINE, *Examiners.*